(12) United States Patent
Mehran

(10) Patent No.: US 11,873,875 B2
(45) Date of Patent: Jan. 16, 2024

(54) SEISMIC BASE ISOLATION DEVICE FOR PROTECTION OF EQUIPMENT USING ROLLER BALL TRANSFER BEARINGS AND A REVERSION SYSTEM COMPRISED OF TENSION SPRINGS OR VISCOUS DAMPERS

(71) Applicant: Ara Jonathan Mehran, Orange, CA (US)

(72) Inventor: Ara Jonathan Mehran, Orange, CA (US)

( * ) Notice: Subject to any disclaimer, the term of this patent is extended or adjusted under 35 U.S.C. 154(b) by 0 days.

(21) Appl. No.: 16/727,700

(22) Filed: Dec. 26, 2019

(65) Prior Publication Data

US 2021/0285514 A1 Sep. 16, 2021

(51) Int. Cl.
*F16F 15/02* (2006.01)
*F16M 5/00* (2006.01)

(52) U.S. Cl.
CPC ............. *F16F 15/022* (2013.01); *F16M 5/00* (2013.01); *F16M 2200/08* (2013.01)

(58) Field of Classification Search
CPC ........ F16F 15/022; F16F 15/021; F16F 1/122; F16F 15/04; F16M 5/00; F16M 2200/08
See application file for complete search history.

(56) References Cited

U.S. PATENT DOCUMENTS

| | | | | |
|---|---|---|---|---|
| 4,917,211 A | * | 4/1990 | Yamada | F16F 15/02 52/167.6 |
| 5,816,559 A | * | 10/1998 | Fujimoto | E04H 9/021 248/636 |
| 6,364,274 B1 | * | 4/2002 | Omi | E04H 9/023 248/562 |
| 8,393,119 B2 | * | 3/2013 | Alsaif | E04H 9/0215 52/167.6 |
| 2017/0350152 A1 | * | 12/2017 | Moreno | E04H 9/023 |

FOREIGN PATENT DOCUMENTS

| | | | | |
|---|---|---|---|---|
| ID | S201500102 A | * | 3/2015 | |
| JP | H1113830 A | * | 1/1999 | |
| JP | 2006118288 A | * | 5/2006 | |

(Continued)

OTHER PUBLICATIONS

Structural Control and Health Monitoring vol. 26, issue 3, titled "Rolling devices for seismic isolation of lightweight structures and equipment. Design and realization of a prototype" by Dora Foti, dated Dec. 21, 2018 (Year: 2018).*

(Continued)

*Primary Examiner* — Terrell L McKinnon
*Assistant Examiner* — Ding Y Tan
(74) *Attorney, Agent, or Firm* — Plager Schack LLP; Mark H. Plager; Michael J. O'Brien

(57) ABSTRACT

The present invention generally relates to the making of a base isolation device to be used for the protection of non-structural items and equipment. When the base plate, which is attached to the ground, moves with the ground earthquake shakings, the isolation plate, supported by the roller ball transfer bearings, rolls over the base plate and prevents the transfer of forces to the overlying equipment. Once the ground shaking ends, the tension springs or viscous dampers pull back the isolation plate to its original position, laterally and rotationally. The height of the isolation device could be as low as 3 inches.

1 Claim, 2 Drawing Sheets

(56) References Cited

FOREIGN PATENT DOCUMENTS

| | | | | |
|---|---|---|---|---|
| JP | 2006342884 | * | 12/2006 | |
| JP | 2006342884 A | * | 12/2006 | |
| JP | 2007239990 | * | 9/2007 | |
| JP | 2018040411 A | * | 3/2018 | ............ F16F 15/085 |
| JP | 3216607 U | * | 6/2018 | ............ F16F 15/027 |
| KR | 101516145 B1 | * | 4/2015 | |
| KR | 101941905 B1 | * | 1/2019 | |
| KR | 101971504 B1 | * | 4/2019 | |
| WO | WO-2020171276 A1 | * | 8/2020 | |

OTHER PUBLICATIONS

"A review of rolling-type seismic isolation: Historical development and future directions" by Scott Harvey Jr, et al. Engineering Structures vol. 125, Oct. 15, 2016, pp. 521-531 (Year: 2016).*

* cited by examiner

SEISMIC BASE ISOLATION DEVICE FOR PROTECTION OF EQUIPMENT USING ROLLER BALL TRANSFER BEARINGS AND A REVERSION SYSTEM COMPRISED OF TENSION SPRINGS OR VISCOUS DAMPERS

BACKGROUND

The present invention generally relates to protection of non-structural equipment from earthquake damage.

There is known a base isolation device for the protection of non-structural equipment in which the device incorporates the use of caster wheels in conjunction with a proprietary universal spring to revert the isolation device to its original position. However, because such a device is supported on caster wheels, it has a minimum height of 7", which may not be feasible or aesthetically appealing for use. Additionally, to revert to its original position such a device incorporates proprietary universal springs which are not readily available in the open market, and must be specified, designed, priced, and provided only by the inventor of the known base isolation device.

SUMMARY

An isolation device is provided with a base plate located at the bottom which will be attached to the supporting ground. A center steel hook is affixed to the center of the base plate. Attach two steel rings to the center steel hook. An isolation plate is supported by four hollow cylindrical legs attached to the bottom of the isolation plate. Each hollow cylindrical leg has a steel hook installed on the perimeter of the hollow cylindrical leg and along lines connecting the center of the hollow cylindrical leg to the center steel hook and located in between the hollow cylindrical leg and the center steel hook. Four tension springs or viscous dampers are attached to the two steel rings, two tension springs or viscous dampers to each steel ring. The other ends of the four tension springs or viscous dampers are attached to the four steel hooks. Each hollow cylindrical leg contains a roller ball transfer bearing. Two steel hooks are installed to the corners of the isolation plate. Two steel hooks are affixed to the corners of the base plate. A minimum of two tension springs or viscous dampers connect the two steel hooks on the isolation plate to the steel hooks on the base plate.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
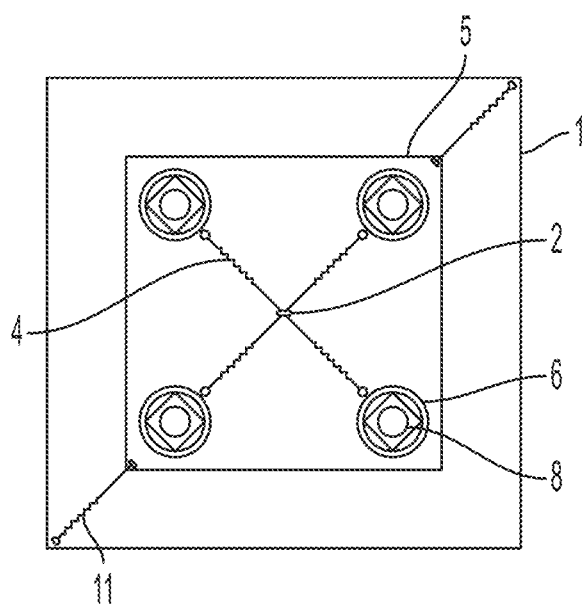
FIG. 1 illustrates the Top View of the preferred embodiment of an isolation device according to the present invention.
Figure 2:
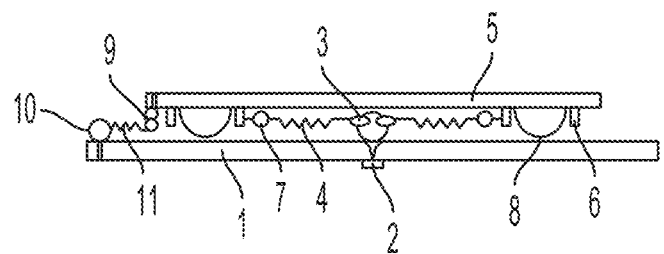
FIG. 2 illustrates the Front View of the preferred embodiment of an isolation device according to the present invention.

By way of example, and referring to FIGS. 1-2, one embodiment of an isolation device comprises a base plate 1 located at the bottom which will be attached to the supporting ground. A center steel hook 2 is affixed to the center of the base plate. Attach two steel rings 3 to the center steel hook 2. An isolation plate 5 is supported by four hollow cylindrical legs 6 attached to the bottom of the isolation plate 5. Each hollow cylindrical leg 6 has a steel hook 7 installed on the perimeter of the hollow cylindrical leg 6 and along lines connecting the center of the hollow cylindrical leg 6 to the center steel hook 2 and located in between the hollow cylindrical leg 6 and the center steel hook 2. Four tension springs or viscous dampers 4 are attached to the two steel rings 3, two tension springs or viscous dampers 4 to each steel ring 3. The other ends of the four tension springs or viscous dampers 4 are attached to the four steel hooks 7. Each hollow cylindrical leg 6 contains a roller ball transfer bearing 8. Two steel hooks 9 are installed to the corners of the isolation plate 5. Two steel hooks 10 are affixed to the corners of the base plate 1. A minimum of two tension springs or viscous dampers 11 connect the two steel hooks 9 on the isolation plate 5 to the steel hooks 10 on the base plate 1.

The invention claimed is:

1. A seismic isolation device, configured to protect equipment during movements; the seismic isolation device consisting of:
    a base plate, joined to a ground surface;
    a center steel hook, joined to a center of the base plate;
    a pair of steel rings, joined to the center steel hook;
    an isolation plate; the top thereof is attached to the equipment to be protected during earthquake;
    four hollow cylindrical legs joined to the bottom of the isolation plate close to each corner;
    four leg steel hooks, attached to at least one hollow cylinder legs and aligned with t diagonal of the isolation plate;
    two tension springs or dampers, attached to at least one leg steel hook on the two adjacent hollow cylindrical legs and to at least one steel ring of the pair of steel rings;
    two tension springs or dampers, attached to at least one leg steel hook of the other two adjacent hollow cylindrical legs and to at least the other steel ring of the pair of steel rings;
    four roller ball transfer bearings, with the ball facing downward, secured within each of the four hollow cylindrical legs; wherein the isolation plate is supported on the roller ball transfer bearings, which are in constant contact with the base plate and could move to an outer edge of the base;
    at least two steel hooks joined the base plate close to the two diagonally opposite corners of the base plate;
    at least two steel hooks joined close to the corners of the isolation plate, which are the closest to the steel hooks joined to the corners of the base plate;
    at least two springs or dampers connect the steel hooks at the corners of the isolation plate to the closest steel hooks at the corners of the base plate.

* * * * *